United States Patent
Chen et al.

(10) Patent No.: US 9,275,231 B1
(45) Date of Patent: Mar. 1, 2016

(54) METHOD AND APPARATUS FOR SECURING A COMPUTER USING AN OPTIMAL CONFIGURATION FOR SECURITY SOFTWARE BASED ON USER BEHAVIOR

(75) Inventors: Joseph H. Chen, Los Angeles, CA (US); Brendon V. Woirhaye, Whittier, CA (US)

(73) Assignee: Symantec Corporation, Mountain View, CA (US)

( * ) Notice: Subject to any disclaimer, the term of this patent is extended or adjusted under 35 U.S.C. 154(b) by 698 days.

(21) Appl. No.: 12/401,422

(22) Filed: Mar. 10, 2009

(51) Int. Cl.
*G06F 21/57* (2013.01)
*G06F 21/56* (2013.01)

(52) U.S. Cl.
CPC ............. *G06F 21/577* (2013.01); *G06F 21/56* (2013.01); *G06F 21/564* (2013.01)

(58) Field of Classification Search
CPC ...... G06F 21/56; G06F 21/564; G06F 21/577
See application file for complete search history.

(56) References Cited

U.S. PATENT DOCUMENTS

| | | | |
|---|---|---|---|
| 7,065,789 B1 * | 6/2006 | Neyman et al. | 726/24 |
| 7,490,356 B2 * | 2/2009 | Lieblich et al. | 726/25 |
| 7,503,067 B2 * | 3/2009 | Yeung et al. | 726/17 |
| 7,836,506 B2 * | 11/2010 | Liu | 726/25 |
| 7,895,656 B1 * | 2/2011 | Brock | 726/24 |
| 2003/0120947 A1 * | 6/2003 | Moore et al. | 713/200 |
| 2003/0131256 A1 * | 7/2003 | Ackroyd | 713/201 |
| 2006/0191012 A1 * | 8/2006 | Banzhof et al. | 726/25 |
| 2006/0282896 A1 * | 12/2006 | Qi | 726/25 |
| 2008/0028470 A1 * | 1/2008 | Remington et al. | 726/25 |
| 2008/0047017 A1 * | 2/2008 | Renaud | 726/25 |
| 2008/0235771 A1 * | 9/2008 | Corley et al. | 726/4 |
| 2008/0301796 A1 * | 12/2008 | Holostov et al. | 726/12 |
| 2013/0276112 A1 * | 10/2013 | Dalcher | 726/23 |

OTHER PUBLICATIONS

"ZoneAlarm: Internet Security Suite—The Most Complete Internet Security," ZoneAlarm, 2007, see first bullet under "Easy-to-Use Security".*
D. Harley, et al. "Heuristic Analysis—Detecting Unknown Viruses," ESET White Paper, Mar. 2007, Retrieved Oct. 9, 2012, Online: http://go.eset.com/us/resources/white-papers/Heuristic_Analysis.pdf.*

* cited by examiner

*Primary Examiner* — Robert Leung
(74) *Attorney, Agent, or Firm* — Wilmer Cutler Pickering Hale and Dorr LLP

(57) ABSTRACT

A method and apparatus for securing a computer using an optimal configuration for security software based on user behavior is described. In one embodiment, the method for providing an optimal configuration to secure a computer based on user behavior includes examining computer user activity to produce behavior indicia with respect to computer security from malicious threats and determining an optimal configuration for security software based on the behavior indicia.

14 Claims, 3 Drawing Sheets

METHOD AND APPARATUS FOR SECURING A COMPUTER USING AN OPTIMAL CONFIGURATION FOR SECURITY SOFTWARE BASED ON USER BEHAVIOR

BACKGROUND

1. Field of the Invention

Embodiments of the present invention generally relate to computer security systems and, more particularly, to a method and apparatus for securing a computer using an optimal configuration for security software based on user behavior.

2. Description of the Related Art

Widespread utilization of Internet technology by various users (e.g., employees, partners, contractors etc. within an enterprise, individuals at home) results in an increase of computer system attacks by various malicious threats (e.g., malicious software programs, such as worms, viruses, Trojan horses and/or the like). Such malicious threats may be transmitted (e.g., downloaded) to the computer system in numerous ways (e.g., as an executable program, an email attachment, malicious HTML code on a web page, and/or the like). For example, a particular malicious threat may be executed on a user computer in order to damage expensive computer hardware, destroy valuable data, consume limited computing resources and/or compromise sensitive information.

Currently, various types of security software programs (e.g., anti-virus, anti-spyware, anti-phishing software programs) utilize one or more detection techniques (e.g., signature validation, behavior blocking, heuristic detection and/or the like), which are often employed to detect the malicious threat and prevent problems caused by the execution of such malicious threats. In general, vulnerability to the malicious software programs correlates with dangerousness of one or more computer user activities. For example, a user computer that is primarily utilized for browsing authorized websites (e.g. news, banks, company intranet, genuine gaming websites etc.) may be less vulnerable than another user computer, through which suspected and/or generally unknown websites are accessed by the respective users. Hence, the user computer and the other user computer require different security settings in order to effectively detect and remediate the malicious threats.

However, the security software programs provide similar security settings for each user computer and disregard different levels of vulnerability to the malicious threats. For example, certain security software programs are configured to use static security settings that suit a majority of users but not a current user. Unfortunately, a high level of security settings (i.e., an aggressive mode) slows down the computer and consumes additional computing resources. As a result, deploying the same security settings for the user computer as that on the other user computer would unnecessarily degrade the performance of the user computer. Although several traditional security software programs have an option for the user to configure the security settings to a satisfactory level (e.g. High, Medium, Low), the default settings are never reconfigured. Further, often the usage pattern is insufficiently known at the time of installation of the security software program, and in such cases, the security software program may be incorrectly configured.

Therefore, there is a need in the art for a method and apparatus for securing a computer using an optimal configuration for security software based on user behavior.

SUMMARY OF THE INVENTION

Embodiments of the present invention generally comprise a method and apparatus for securing a computer using an optimal configuration for security software based on user behavior. In one embodiment, a method for providing an optimal configuration to secure a computer based on user behavior includes examining computer user activity to produce behavior indicia with respect to computer security from malicious threats and determining an optimal configuration for security software based on the behavior indicia.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
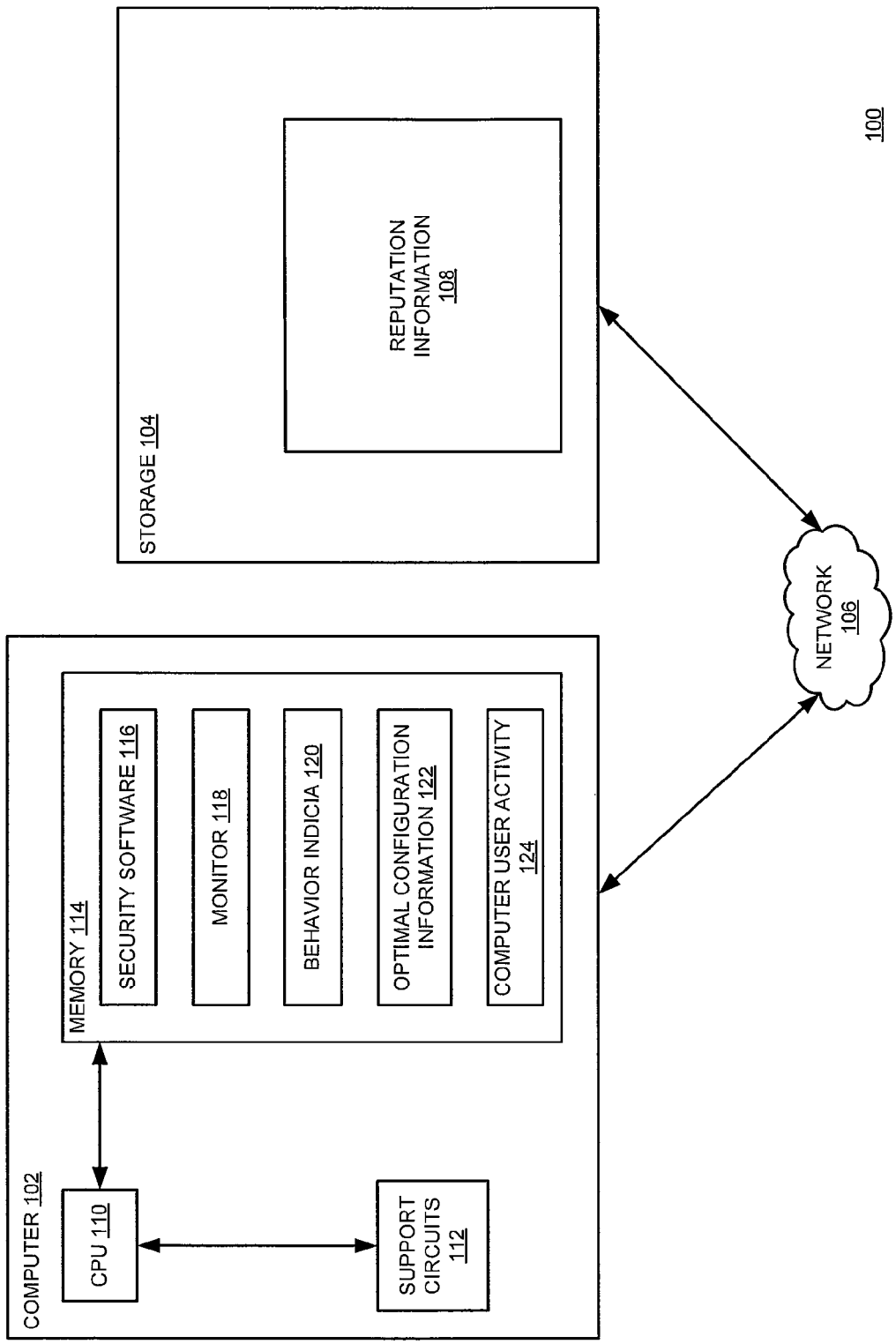
FIG. 1 is a block diagram of a system for securing a computer using an optimal configuration for security software based on user behavior in accordance with one or more embodiments of the invention.

FIG. 1 is a block diagram of a system 100 for securing a computer using an optimal configuration for security software based on user behavior according to one or more embodiments of the invention. The system 100 includes a computer 102 and storage 104 where both are coupled to each other through a network 106.

The computer 102 is a type of computing device (e.g., a laptop, a desktop, a Personal Digital Assistant (PDA), a mobile phone and/or the like), such as those generally known in the art. The computer 102 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits and the like. The memory 114 comprises at least one of Read Only Memory (ROM), Random Access Memory (RAM), disk drive storage, optical storage, removable storage and the like. The memory 114 includes various software packages, such as security software 116 and a monitor 118. The memory 114 further includes various data, such as behavior indicia 120, optimal configuration information 122 and computer user activity 124.

Generally, the storage 104 includes various components (i.e., hardware and software) that are configured to manage storage resources within a computing environment. The storage 104 generally includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the computer 102.

As described further below, the storage 104 facilitates permanent storage of reputation information 108.

Generally, the network 106 comprises a communication system that connects computers by wire, cable, fiber optic and/or wireless link facilitated by various types of well-known network elements, such as hubs, switches, routers and the like. The network 106 may employ various well-known protocols to communicate information amongst the network resources. For example, the network 106 may be a part of the Internet or intranet using various communications infrastructure, such as Ethernet, WiFi, WiMax, General Packet Radio Service (GPRS) and the like.

In one embodiment, the reputation information 108 may indicate reputation ratings (i.e. good or bad) for one or more websites. Hence, a website associated with a good reputation is most likely safe to browse. On the other hand, a website associated with a bad reputation is most likely unsafe. Such a website most likely contributes to proliferation of the malicious threats. According to one embodiment, the reputation information 108 may include a blacklist and/or a whitelist. Moreover, the blacklist indicates the one or more websites that are not safe to access. In other words, the websites within the blacklist have bad reputations. Furthermore, the whitelist indicates the one or more websites that are safe to access. In other words, the websites within the whitelist have good reputations and are not associated with distribution of malicious threats.

Generally, the security software 116 may provide various software-based technologies that safeguard the computer 102 against a broad range of malicious threats, such as malicious software programs. In one embodiment, the various software-based technologies (e.g., anti-virus, anti-spyware, email scanning, anti-phishing, firewall, web-site authentication, anti-rootkit and/or identity protection technologies) detect the malicious threats and mitigate any damage. For example, SYMANTEC Norton AntiVirus provides antivirus and Internet worm detection and removal technologies to protect the computer 102 from the malicious threats. The security software 116 may utilize various detection techniques (e.g., behavior blocking, machine learning and/or heuristics-based techniques) to identify the malicious threats to the computer 102. For example, SYMANTEC Norton AntiBot uses active behavioral-based analysis to provide real-time protection against web robot (i.e., bot) attacks, block web robots from hijacking the computer 102 and prevent identity theft.

Generally, the computer user activity 124 includes information regarding one or more activities engaged by a user of the computer 102. As described further below, the computer user activity 124 may include Internet activity, an infection history, a security patch level and/or the like. Furthermore, the computer user activity 124 is examined to produce the behavior indicia 120 with respect to computer security. Vulnerability of the computer 102 to malicious threats depends upon the computer user activity 124. For example, the computer user activity 124 may include suspicious internet activity indicating that the computer 102 is highly vulnerable to the malicious threats transmitted through the Internet. For instance, the suspicious internet activity may reflect access of unauthorized and/or known malicious websites. As another example, an infection history replete with detected viruses and phishing attacks indicate that the computer 102 is highly vulnerable to the malicious threats.

According to various embodiments, the computer user activity 124 may include information regarding security patch installation tendencies, such as a security patch level. For example, a security patch level may indicate a failure to regularly install one or more security patches for the security software 116. The user of the computer 102 may not manually check for new security patches (e.g., virus definitions, internet worm protection signature update, firewall program update, and/or the like) and/or does not regularly install the new security patches. As a result, the computer 102 is more vulnerable to the malicious threats.

Furthermore, the computer user activity 124 may indicate a failure by the user to enable a security configuration level for the security software 116 where new and/or necessary security patches are automatically installed on the security software 116. If such a security configuration level is not enabled, then the new security patches may not be installed on the computer 102. As a result, the computer 102 becomes more vulnerable to the malicious threats. On the other hand, the computer user activity 124 may indicate regular and/or automatic security patch installation. For example, the user may enable a security configuration level in the security software 116 in which a message is displayed on the computer 102 indicating that one or more new security patches are available (e.g., SYMANTEC LiveUpdate). Then, the user manually downloads and installs the one or more new security patches. As another example, the one or more new security patches may be automatically downloaded and installed on the computer 102.

According to various embodiments, the computer user activity 124 may include information regarding Internet activity. For example, the user may utilize the computer 102 primarily for playing one or more online games for an average connection time of an hour per day. As another example, the user regularly may access one or more websites to communicate with other users (e.g., through Instant Messaging (IM) and/or emails), conduct research (e.g., through educational websites, digital libraries and expert discussion forums), perform business applications (e.g., online securities trading and bank account management), for personal entertainment (e.g., downloading online video, game) and/or the like. In either example, the computer user activity includes various data associated with accessed websites, such as Uniform Resource Locators (URLs), domain names, Internet Protocol (IP) addresses and/or the like.

In addition, the computer user activity 124 may indicate dangerous risks and/or tendencies associated with one or more websites. In one embodiment, the user may access a variety of websites, such as common, legitimate websites (e.g., whitelisted) as well as illegitimate and/or suspicious websites (e.g., blacklisted). For example, the user may access certain websites (e.g., YouTube, Torrent and/or the like) and download content is submitted by one or more other users. The user, however, may only browse these websites and not download any content (e.g., image, video, application and/or the like). As another example, the user may access or browse the websites that are highly suspicious, such as piratebay.com, crack.am and/or the like.

According to various embodiments, the computer user activity 124 may include information regarding an infection history. In one embodiment, the infection history indicates a likelihood that the user comprises the computer 102 (i.e., how prone the computer 102 is to infections). For example, the infection history may includes viruses detected in Portable Executable (PE) file headers by various security tools (e.g., AutoProtect, BASH (Behavioral and System Heuristic), and/or MalHeur) as well as attacks blocked by the various security tools (e.g., Canary, Browser Defender, UDLP (Unauthorized Demo License Protection), Deuce and/or the like).

According to various embodiments, the monitor 118 examines the computer user activity 124 to identify suspicious and/or dangerous Internet activity. In one embodiment, the monitor 118 compares the Internet activity of the user with the reputation information 108 to produce the behavior indicia 120. For example, the monitor 118 compares one or more URLs with the reputation information 108 to determine the reputation ratings for the one or more websites. Based on an analysis of such reputation ratings, the monitor 118 determines if the user has a tendency to access dangerous websites.

According to various embodiments, the monitor 118 analyzes an infection history associated with the computer 102 to produce the behavior indicia 120. In one embodiment, the monitor 118 utilizes an infection potential metric to produce the behavior indicia 120 from the infection history. In one embodiment, the infection potential metric may be defined in terms of a number of the malicious threats detected and/or remediated by the security software 116. In one embodiment, the monitor 118 identifies a total number of the malicious threats, which have been detected and/or blocked by the security software 116. If the total number of the malicious threats exceeds a pre-defined threshold, then the computer 102 is considered to be vulnerable to infections from the malicious software programs. In one embodiment, the monitor 118 determines a number of unsigned binary files stored within the computer 102. The monitor 118 determines the computer 102 to be highly vulnerable to the malicious threats (e.g., a high potential for infection) if a percentage of the unsigned binary files at the computer 102 exceeds a predefined threshold. Basically, the monitor 118 determines if the user is likely to compromise the computer 102.

According to various embodiments, the behavior indicia 120 with respect to computer security from malicious threats. Basically, the behavior indicia 120 represent vulnerability of the computer 102 to the malicious threats. On the basis of the behavior indicia 120, an optimal configuration of the security software 116 is determined. In another embodiment, a predetermined threshold value may be provided for the behavior indicia 120, above which the computer user activity 124 is considered to be highly suspicious. For example, the user may access illegitimate websites and/or may infrequently update anti-virus software. Hence, the computer 102 is most likely vulnerable to the malicious threats due to such highly suspicious computer user activities.

According to various embodiments, the monitor 118 is configured to determine an optimal configuration for the security software 116 based on the behavior indicia 120. In operation, the monitor 118 automatically configures the security software 116 with one or more security settings in accordance with the optimal configuration. In one embodiment, the monitor 118 determines the optimal configuration for various security software settings, which define one or more security software levels and/or operations (e.g., an aggressive mode). For example, if the behavior indicia 120 exceed a pre-determined threshold value, then the computer user activity 124 is suspicious and the computer 102 is most likely vulnerable to the malicious threats.

In response, the security software 116 is configured to operate with one or more security software settings associated with an aggressive mode in order to remediate subsequent malicious threats. The security software 116 and the monitor 118 cooperate to automatically adjust the one or more security settings. After the monitor 118 stores the one or more security software settings in the optimal configuration information 122, the security software 116 operates in the aggressive mode. Consequently, the security software 116 detects more malicious threats while increasing a rate of false positives.

In one embodiment, the optimal configuration information 122 may define a security setting that enables a high detection level for various security tools (e.g., Canary, UADLP and/or the like) utilized by the security software 116. For example, at the high detection level, the security software 116 may immediately kill or terminate one or more open browser windows at the computer 102. In another embodiment, the optimal configuration information 122 may define a security setting that enables regular and/or automatic security patch installation. Further, the optimal configuration information 122 may define a security setting that enables malware detection (e.g., MalHeur) for static file scans. In yet another embodiment, the optimal configuration information 122 may define a security setting for decreasing a threshold value for heuristic-based detection techniques, such as BASH. Moreover, the optimal configuration information 122 may define another security setting that enforces an early boot of a real-time file scanning component (e.g., AutoProtect). As a result, the security software executes a real-time security scan of the computer 102.

Figure 2:
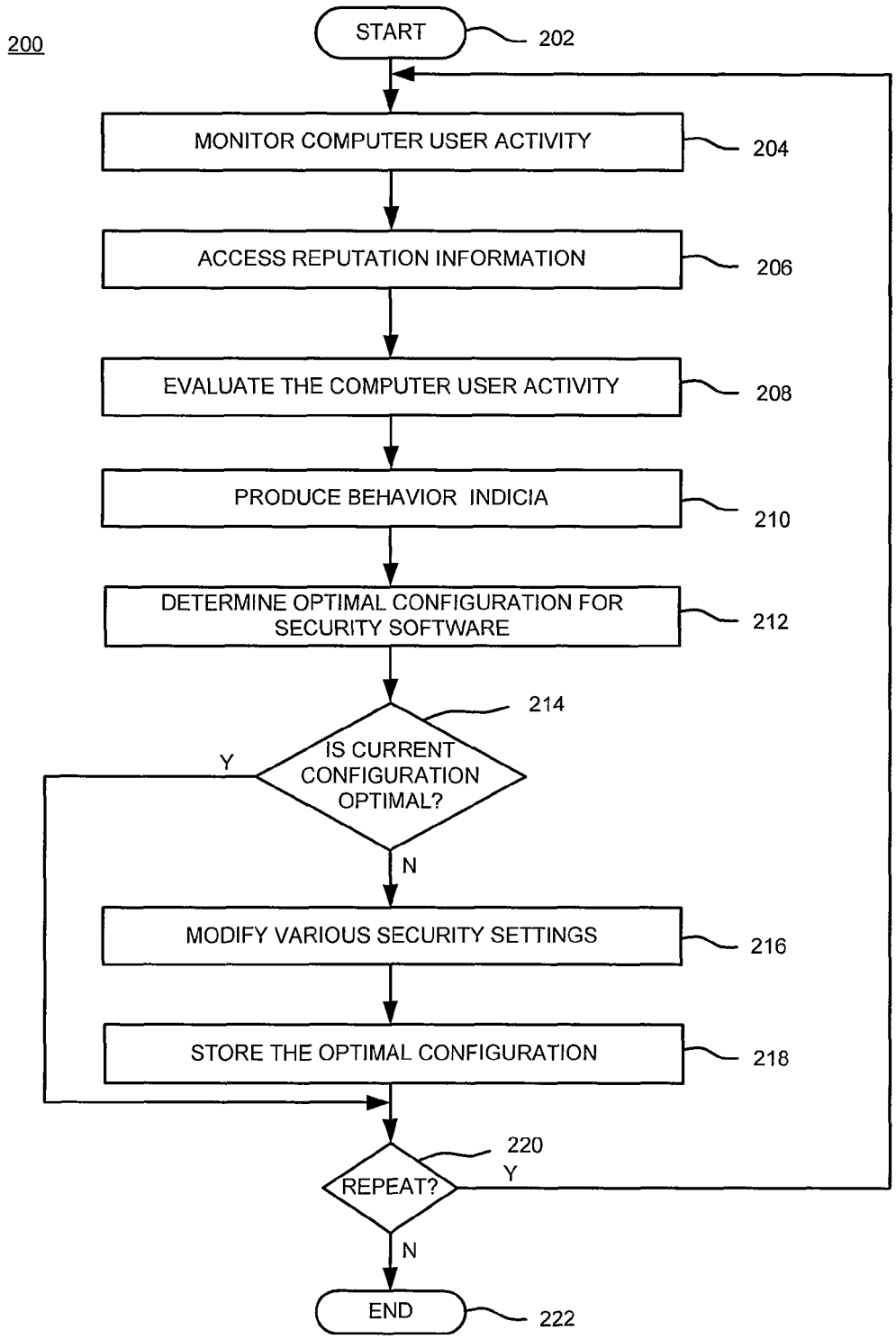
FIG. 2 is a flow diagram of a method for determining an optimal configuration for security software of a computer in accordance with one or more embodiments of the invention.

FIG. 2 is a flow diagram of a method 200 for determining an optimal configuration for security software (e.g., the security software 116 of FIG. 1) according to one or more embodiments of the invention. The method 200 starts at step 202 and proceeds to step 204, at which, computer user activity (e.g., the computer user activity 124 of FIG. 1) is monitored. In one embodiment, a monitor (e.g., the monitor 118 of FIG. 1) examines one or more activities (e.g., browsing websites, detecting malicious threats, installing security patches and/or the like) performed by a user of a computer (e.g., the computer 102 of FIG. 1).

At step 206, reputation information (e.g., the reputation information 108 of FIG. 1) is accessed. After the step 206, the method 200 proceeds to step 208, at which the computer user activity is examined. In one embodiment, the monitor accesses the reputation information to identify suspicious Internet activity. At step 210, behavior indicia (e.g., the behavior indicia 120 of FIG. 1) are produced. In one embodiment, the monitor produces the behavior indicia associated with the computer on the basis of the examined computer user activity. At step 212, an optimal configuration for the security software is determined. In one embodiment, the optimal configuration defines various security settings for operating the security software and protecting the computer from malicious threats.

At step 214, a determination is made as to whether current configuration of the security software is optimal. Further, an optimal configuration of the security software provides a reasonable security to the computer. If at the step 214, it is determined that the current configuration of the security software is optimal (option "YES"), then the method 200 proceeds to step 220. If, at the step 214, it is determined that the current configuration of the security software is not optimal (option "NO"), then the method 200 proceeds to step 216. At the step 216, various security settings of the security software are modified. In one embodiment, the computer user activity may be highly suspicious. Further, if it is ascertained that the current configuration of the security software is not sufficient to protect the computer from malicious threats, then the current configuration is modified in accordance with the determined optimal configuration. For example, the optimal configuration may include enabling of previously disabled heuristic scanning to detect malicious threats.

At step 218, the optimal configuration is stored. In one embodiment, the various security settings for the security software are stored as optimal configuration information (e.g., the optimal configuration information 122 of FIG. 1). At step 220, a determination is made as to whether the computer user activity monitoring is to be repeated. If at the step 220, it is determined that the computer user activity monitoring is to be repeated (option "YES"), then the method 200 returns to the step 204. If at the step 220, it is determined that the computer user activity monitoring is not to be repeated (option "NO"), then the method 200 proceeds to step 222. At the step 222, the method 200 ends.

Figure 3:
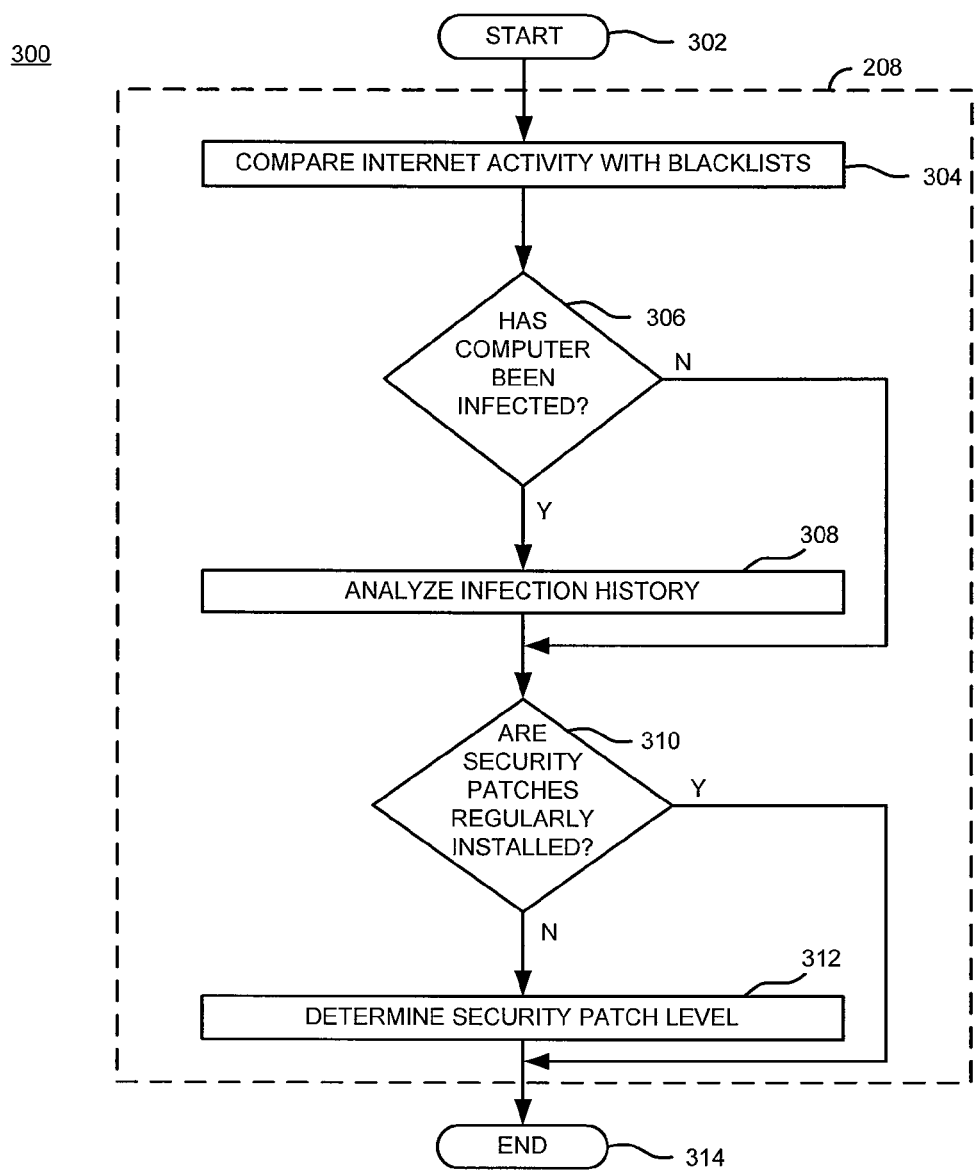
FIG. 3 is a flow diagram of a method for examining computer user activity of a computer in accordance with one or more embodiments of the invention.

FIG. 3 is a flow diagram of a method 300 for examining computer user activity (e.g., the computer user activity 124 of FIG. 1) of a computer according to one or more embodiments of the invention. In one embodiment of the invention, the method 300 provides the functionality of the step 208 of the method 200. The method 300 starts at step 302 and proceeds to step 304, at which an Internet activity of a user of the computer (e.g., the computer 102 of FIG. 1) is compared with blacklists. In one embodiment, one or more websites accessed by the user are compared with the blacklists to determine whether the internet activity is suspicious.

At step 306, a determination is made as to whether the computer is infected. If, at the step 306, it is determined that the computer is not infected (option "NO"), then the method 300 proceeds to step 310. If, it is determined that the computer is infected (option "YES"), then the method 300 proceeds to step 308. At step 308, an infection history of the computer is analyzed. For example, the infection history may indicate a total number of malicious threats detected and/or remediated by security software. Accordingly, the infection history of the computer is analyzed to determine whether the computer is prone to infections.

The step 308 of the method 300 proceeds to step 310, at which a determination is made as to whether security patches are regularly installed on the computer. If, at the step 310, it is determined that the security patches are regularly installed (option "YES"), then the method 300 proceeds to step 314. If, at the step 310, it is determined that the security patches are not regularly installed on the computer (option "NO"), then the method 300 proceeds to step 312. At the step 312, a security patch level is determined. At step 314, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for providing an optimal configuration to secure a computer based on user behavior, comprising:
   examining, using at least one hardware processor disposed on the computer, user activity associated with the computer and stored reputation information associated with a plurality of web sites to produce behavior indicia representing vulnerability of the computer to malicious threats, wherein the examining comprises analyzing web activity and a security patch level to produce the behavior indicia;
   determining an optimal configuration for security software by analyzing the behavior indicia, wherein the optimal configuration defines a value for a variable heuristic-based detection, wherein the variable heuristic-based detection is configured to provide dynamic non-static heuristic scanning for detecting malicious threats, and wherein the scanning is not predefined;
   automatically configuring at least one security setting in accordance with the value defined by the optimal configuration;
   installing at least one security patch on the computer in accordance with the optimal configuration; and
   executing a real-time security scan of the computer for malicious threats in accordance with the optimal configuration.

2. The method of claim 1, wherein a threshold value for heuristic-based detection of malicious threats is decreased in accordance with the optimal configuration.

3. The method of claim 1, wherein examining the computer user activity further comprises analyzing an infection history to produce the behavior indicia.

4. The method of claim 1, wherein examining the computer user activity further comprises analyzing the infection history using an infection potential metric to produce the behavior indicia.

5. The method of claim 1, wherein examining the computer user activity further comprises comparing the user activity with the reputation information to identify suspicious internet activity.

6. The method of claim 1, wherein examining the computer user activity further comprises determining a percentage of unsigned binary files.

7. The method of claim 1, wherein the behavior indicia represents vulnerability of the computer to the malicious threats.

8. An apparatus for providing an optimal configuration to secure a computer based on user behavior, comprising:
   at least one hardware processor disposed on the computer communicatively coupled to at least one memory, wherein the at least one memory comprises a monitor configured to:
   examine user activity associated with the computer and stored reputation information associated with a plurality of web sites to produce behavior indicia representing vulnerability of the computer to malicious threats, wherein the examining comprises analyzing web activity and a security patch level to produce the behavior indicia;
   determine an optimal configuration based on the behavior indicia, wherein the optimal configuration defines a value for a variable heuristic-based detection, wherein the variable heuristic-based detection is configured to provide dynamic non-static heuristic scanning for detecting malicious threats, and wherein the scanning is not predefined;
   automatically configure security software in accordance with the value defined by the optimal configuration, wherein the security software installs at least one security patch on the computer in accordance with the optimal configuration; and
   execute a real-time security scan of the computer for malicious threats in accordance with the optimal configuration.

9. The apparatus of claim 8, wherein the security software adjusts at least one security setting in accordance with the optimal configuration.

10. The apparatus of claim 8, wherein the security software decreases a threshold value for heuristic-based detection of the malicious threats in accordance with the optimal configuration.

11. The apparatus of claim 8, wherein the monitor analyzes the infection history using an infection potential metric to produce the behavior indicia.

12. The apparatus of claim 8, wherein the monitor examines the computer user activity by comparing the user activity with the reputation information to identify suspicious internet activity.

13. A system for providing an optimal configuration to secure a computer based on user behavior, comprising:

at least one hardware processor disposed on the computer, comprising:
- a monitor configured to examine user activity associated with the computer and stored reputation information associated with a plurality of web sites to produce behavior indicia representing vulnerability of the computer to malicious threats and to determine an optimal configuration based on the behavior indicia, wherein the examining comprises analyzing web activity and a security patch level to produce the behavior indicia, wherein the optimal configuration defines a value for a variable heuristic-based detection, wherein the variable heuristic-based detection is configured to provide dynamic non-static heuristic scanning for detecting malicious threats, and wherein the scanning is not predefined; and
- security software configured to automatically adjust at least one security setting in accordance with the optimal configuration, install at least one security patch on the computer in accordance with the optimal configuration, and to execute a security scan of the computer in accordance with the optimal configuration.

14. The system of claim 13 further comprising storage that comprises reputation information that is compared with the computer user activity to identify suspicious internet activity.

\* \* \* \* \*